United States Patent Office 3,362,922
Patented Jan. 9, 1968

3,362,922
PROCESS FOR PREPARING FAST CURING FLUIDIZED BED COATING COMPOSITIONS
Joseph P. Manasia, Union, and Roy A. Allen, Iselin, N.J., assignors to Shell Oil Company, New York, N.Y., a corporation of Delaware
No Drawing. Filed May 27, 1965, Ser. No. 459,421
11 Claims. (Cl. 260—18)

ABSTRACT OF THE DISCLOSURE

A process for the preparation of homogeneous fluidizable polyepoxide coating compositions which comprises pulverizing:
(1) a polyepoxide resin
(2) benzophenone tetracarboxylic dianhydride
(3) a stannous salt, in a pebble mill containing cylindrical high density grinding media.

---

This invention relates to a fast curing thermosetting resin coating composition. More particularly, this invention relates to a process for preparing polyepoxide resin compositions which are especially suitable for application in fluidized bed processes and molding compositions.

This application is a continuation-in-part of copending application Ser. No. 332,943, filed Dec. 23, 1963.

Specifically, the invention provides a one-step process for preparing homogeneous fluidizable polyepoxide coating compositions which comprises pulverizing (1) a polyepoxide having a vic-epoxy equivalency greater than 1.0, (2) a benzophenone tetracarboxylic dianhydride and (3) a stannous salt of a monocarboxylic acid in a pebble mill containing high density media, and preferably cylindrical high density media, as the essential grinding media.

It is extremely important in fluidized bed coating processes to utilize a coating composition which is not only ground to a desirable size-range but also does not segregate into the respective diverse ingredients upon standing. It is known that coating compositions prepared by grinding in ball mills using balls and pebbles are powders which to a greater or lesser degree segregate upon standing, presumably due to the different specific gravities and particle sizes of the various components. Such segregation causes wide and undesirable variations in the film properties of the final cured fluidized coating composition.

It has been unexpectedly found that extended milling of certain polyepoxide compositions with certain types of grinding media, i.e., high density media, agglomerates the diverse ingredients of the polyepoxide formulation into homogeneous composites which do not segregate. The cured films prepared from compositions prepared by this novel milling method have excellent predictable physical properties.

It is therefore the primary object of the present invention to provide a dry blending process for preparing rapid-curing, flexible polyepoxide coating compositions which agglomerates the diverse ingredients of the formulation into homogeneous powder composites which do not segregate. Other objects will become apparent to one skilled in the art from the following detailed description.

The objects of the present invention may be accomplished by a process which comprises pulverizing (1) a polyepoxide having a vic-epoxy equivalency greater than 1.0, (2) a benzophenone tetracarboxylic dianhydride and (3) a stannous salt of a monocarbolic acid, particularly a fatty acid having from about 5 to about 20 carbon atoms in the molecule, in a pebble mill containing high density media as the essential grinding media.

Generally, the components are added, in any order, to the pebble mill which already contains the grinding media charge after charging, the pebble mill is run for a sufficient time to assure proper particle agglomeration and film flow. The time period required for agglomeration is dependent on (1) the size of the pebble mill used, (2) the rotational speed of the mill and (3) the volume ratio of media to formulation components. The time period in the mill required for the proper film flow to be developed is very much dependent on the type of grinding media used (i.e., size, shape, and media density). In general, the volume ratio of grinding media to total mill volume can be varied considerably depending upon the above-noted factors; however, such a ratio is usually between about 25% and 75% with about 50% being an especially good ratio. Upon termination of the grinding period, the powder is discharged and without further treatment is ready for use.

It will be appreciated that the present one-step process utilizing a pebble mill and high density media not only provides a simple process for pulverizing the ingredients into a fine powder but also envelops each individual particle of the powder with a uniform coating of a liquid catalyst and agglomerate such catalyst-treated particles with the curing agent into homogeneous composites which do not segregate.

The benzophenone tetracarboxylic dianhydrides which may be employed in the present invention have the following structural formula:

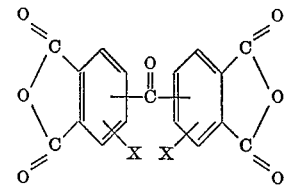

wherein X represents hydrogen, halogen, —NO₂, —COOH, —SO₃H or —NH₂ and may be the same or different radical.

Representative benzophenone tetracarboxylic dianhydrides include, among others 3,3',4,4'-benzophenone tetracarboxylic dianhydride; 2-bromo-3,3'-4,4'-benzophenone tetracarboxylic dianhydride; 2-carboxy-2'-sulfo-3,3',4,4'-benzophenone tetracarboxylic dianhydride; 2-amino-2,3', 4,4'-benzophenone tetracarboxylic diahydride; and 5-nitro-2,3',3,4'-benzophenone tetracarboxylic dianhydride.

These dianhydrides may be prepared by oxidizing appropriate aryl compounds with nitric acid. In general, a nitric acid concentration of from about 5% to about 70% is employed and the amount may range from about 8.0 to about 17.0 on a molar ratio of 100% nitric acid relative to the aryl compound. The oxidation time can range from a few minutes to 2 or more days with from about 10 minutes to 2 hours generally employed. Temperatures of about 110° C. to about 350° C., with 150° C. to 250° C. being preferred, are employed. Since the oxidation reaction is preferably conducted in the liquid phase, pressures from about atmospheric to 500 pounds per square inch or higher are utilized. Upon completion of the oxidation reaction, the reaction mixture is allowed to cool, preferably down to about room temperature whereupon the reacton product precipitates out after from about 2 to 24 hours. These crystals of product are then separated from the liquid by any suitable means such as by filtration. The dried crystals are the dianhydrides utilized in the present compositions.

The aryl compounds which may be employed to produce the benzophenone tetracarboxylic dianhydrides of the present invention may be represented by the general structural formula:

wherein Ar represents the same or different aryl radicals containing one or more rings and wherein at least one is an aromatic ring attached directly to the carbon atom in said formula, such as phenyl, biphenyl, naphthyl, phenanthryl, anthryl, indyl dihydronaphthyl and cyclohexylphenyl, said radicals carrying as nuclear substituents at least two radicals defined by $R_1$, said latter radicals being located at least two positions away from said carbon in the formula; and $R_1$ is selected from the group consisting of primary, secondary and tertiary alkyls having from one to 16 carbon atoms, such as methyl, ethyl, n-propyl, isopropyl, isobutyl, amyl, isoamyl, hexyl, isooctyl, decyl, tetradecyl, hexadecyl, and the like. The remaining positions on the aromatic rings can include radicals such as said diverse radicals defined hereinabove as well as alkyl groups having from one to 10 carbon atoms. It is critical in order to obtain the anhydrides useful in the present compositions that the nuclear substituents on the aromatic rings, defined above by $R_1$, be located at least two positions away from the carbon in the structural formula immediately above, otherwise the compounds produced will not be anhydrides but could be lactones.

Suitable aryl compounds which may be oxidized to produce dianhydrides useful in the present composition include, among others, 1,1′-bis(3,4,3′,4′-tetramethylphenyl)ethane,
1,1-bis(2,2′-dibromo-3,4,3′,4′-tetramethylphenyl)ethane,
1-(3-methyl-4-ethylphenyl) 1-2′-nitro-3′,4′-diethylphenyl) ethane,
1,1-bis(3,4,3′,4′-tetramethyl-5-aminophenyl)ethane,
1,1-bis(3-ethyl-4-butylphenyl)isobutane,
1-(3,4-diethylphenyl) 1-(3′,4′-diisopropylphenyl)ethane,
1,1-bis(3,4,3′,4′-tetramethylphenanthryl)ethane,
1-(3-methyl-4-isopropylnaphthyl) 1-(3′,4′-diethylanthryl) ethane, etc.

The preferred aryl compound is di-ortho-xylylethane, which when oxidized with nitric acid at about 200° C., yields 3,3′,4,4′-benzophenone tetracarboxylic dianhydride.

The polyepoxide materials used in preparing the composition of the present invention comprise those organic materials which have more than one vic-epoxy group, i.e., more than one

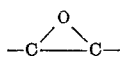

group, which group may be in a terminal position, i.e., a

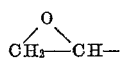

group or in an internal position, i.e., a

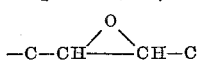

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene,
1,3-bis(2,3-epoxypropoxy)benzene,
4,4′-bis(2,3-epoxypropoxy)diphenyl ether,
1,8-bis(2,3-epoxypropoxy)octane,
1,4-bis(2,3-epoxypropoxy)cyclohexane,
4,4′-bis(2-hydroxy-3,4′-epoxybutoxy)diphenyl dimethylmethane,
1,3-bis(4,5-epoxypentoxy-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenol)butane, 4,4′-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C, and D.

Another group of polyepoxides comprises the polyepoxypolyethers obtained by reacting preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expressions "polyhydric alcohols" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexane triol, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable such polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated caster oil, methyl linoleate, butyl linolinate, ethyl 9,12-octadecadienoate, butyl 9,12,15-octadecatrienoate, ethyl eleostearate, octyl 9,12-octadecadienoate, methyl elostearate, monoglycerides of tung oil fatty acid, monoglycerides of soyabean oil, sunflower, rapeseed, hempseed, sardine, cotton seed oil, and the like.

Another group of the epoxy-containing materials having internal epoxy groups include the epoxidized esters of unsaturated alcohols having the ethylenic group in an internal position and polycarboxylic acids, such as, for example, (di(2,3-epoxybutyl)adipate, di(2,3-epoxybutyl) oxalate, di(2,3-epoxyhexyl)succinate, di(2,3-epoxyoctyl) tetrahydrophthalate, di(4,5 - epoxydodecyl)maleate, di (2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalcanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6-diepoxycyclohexane-dicarboxylate, dibenzyl 1,2,4,5-diepoxycyclohexane-12-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1,500 and between about 2,700 and 3,100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the Polyethers D and E, noted above, or may be a blend of resins in which one of them is a liquid grade, such as a polyepoxide having an epoxy equivalent weight of between 225 and 290 and an average molecular weight of between 450 and 500 as represented by Polyether T. Thus, a suitable mixture of polyepoxides is a mixture containing between 450 and 500 as represented by Polyether A. Thus, from an epihalohydrin and 2,2-bis(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 100° C., and preferably, a resin having a melting point in the range of 120–160° C., and a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point of between 60 and 80° C. (Polyether D).

Stannous salts which are especially suitable for catalyzing the present compositions are the stannous salts of monocarboxylic acids having at least 5 carbons atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from about 0.1 to 5 parts per one hundred parts of polyepoxide and preferably from about 0.5 to 5 parts per one hundred parts of polyepoxide.

Suitable fillers which may be employed as desired, include, among many others, aluminum powder, mica, bentonites, clays, synthetic resins and elastomers, ignited $Al_2O_3$, short-fiber asbestos, wood flours, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranges from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives, castor oil derivatives and the like.

The proportion of the polyepoxide, benzophenone dianhydride curing agent, fillers, catalysts, thixotroping agents and other additives will vary within wide ranges; however, rapid cure and excellent film flexibility is achieved when the final composition comprises from about 50 to 80 parts by weight of polyepoxide and from about 5 to 20 parts by weight of benzophenone tetracarboxylic dianhydride; from about 0.1 to 5 parts of a stannous salt of a monocarboxylic acid; and, optionally, from about 5 to 50 parts by weight of filler.

A particularly good composition prepared by the present process possessing outstanding flexibility and solvent resistance when cured in 1 minute or less at a temperature range of 400–450° F. comprises from about 65 to 75 parts by weight of a glycidyl polyether of 2,2-bis(4-hydroxyphenyl)propane having a molecular weight of from about 900 to about 1,500, an epoxide value of about 0.10 to about 0.20 eq./100 g., and a hydroxyl value of about 0.32 to 0.35 eq./100 g. from about 8 to 15 parts by weight of 3,3',4,4'-benzophenone tetracarboxylic dianhydride, and from about 0.5 to 3.0 parts by weight of stannous octoate.

Another particularly good composition having excellent flexibility and rapid curing properties can be prepared by the present process when the polyepoxide in the above composition is a glycidyl polyether of 2,2-bis(4-hydroxyphenyl)propane having an epoxy value of about 0.05 eq./100 g., a molecular weight of about 2,900 and a melting point of from about 127–133° C. by Durrans' Mercury Method.

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated, it should, of course, be completely immersed in the fluidized bed. The article is preferably moved backwards and forwards in the bed, over a period of time determined by the desired thickness of coating. For the production of thin coating, i.e., less than 0.015 inch thick, the period during which an article is dipped or immersed into the bed is usually less than three seconds.

After the article has been in contact with the fluidized bed for the desired time, it is removed, excess powder adhering to the article is preferably removed, and the coating cured by heating to at least 125° C., and preferably between 150 and 250° C.

The compositions of the instant invention may also be sprayed as by a compressed air spray gun or electrostatically, i.e., by maintaining a difference in electrostatic charge between the particles and the article to be coated.

A feature of the present invention is the utilization of high density grinding media. The high density grinding media may be spherical or cylindrical in shape with cylindrical media being preferred. The spherical media may range from about ¼ inch in diameter to 2 or more inches in diameter with a preferred diameter of from about ½ to 1½ inches in diameter. In general, the cylindrical media may range from about ½ inch in diameter to 2 or more inches in diameter with the preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media is preferred although metallic grinding media such as steel, may be used in applications where metallic contamination is not a limiting consideration.

The volume ratio of media to formulation components may vary through a wide range with a ratio of from about 1:1 to about 5:1 being usually employed. Very good results are obtained when the weight ratio of media to components is from about 1:1 to about 10:1 with a ratio of about 5:1 to 10:1 being preferred.

As noted hereinbefore, the time required to assure proper agglomeration and film flow is dependent on many factors. Under the precise conditions set forth in Example I which follows, the pulverized composition is ready for use after about 6 hours. It is generally preferred to screen the product to pass 100% through an 80 or 100 mesh screen.

While the polyepoxide may be added to the pebble mill in flake or lump form, i.e., without pregrinding, it is generally preferred to pregrind the polyepoxide to approximately 20 mesh.

The one-step process of the instant application is also very suitable for the preparation of epoxy/thermoplastic agglomerates such as polyepoxide/nylon, polyepoxide/polyethylene and polyepoxide/cellulose acetate butyrate. Such agglomerated crosslinked products prepared by the present process possess the superior adhesion properties of the polyepoxide resins as well as outstanding flexibility and impact resistance.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

*Example I*

This example illustrates the preparation of a fluidizable polyepoxide composition by the novel pebble mill method and the film properties of the cured film.

A rapid curing fluidizable composition was prepared from the following components:

|  | Parts by Weight | Percent Weight |
|---|---|---|
| Polyepoxide (a glycidyl polyether of 2,2-bis(4-hydroxyphenyl) propane having a melting point of 98° C., a molecular weight of 1,400 and an epoxide value of 0.103 eq./100 g.) | 9,236.4 | 70.21 |
| 3,3',4,4'-benzophenone tetracarboxylic dianhydride | 1,178.7 | 8.96 |
| Filler (Silica 219, fine silica sand manufactured by Whittaker, Clark, and Daniels, Inc.) | 2,100.3 | 15.97 |
| Titanium Dioxide | 394.5 | 3.00 |
| Chrome Oxide Green | 131.4 | 1.00 |
| Stannous Octoate | 92.7 | 0.70 |
| Defoamer (PC-1344, manufactured by Monsanto Chemical Co., 60% in xylene) | 20.4 | 0.16 |
|  | 13,154.4 | 100.00 |

The polyepoxide was preground to approximately 20 mesh. Twenty-nine pounds of the above formulation was added to a P. O. Abbe, Inc., No. 5 jar mill with Lummard one-piece porcelain jar with ground-in cover and having a capacity of 24.25 gallons and containing 198 pounds of "Borundum" high density (3.65 sp. gr.) cylindrical grinding media 13/16″ x 13/16″ O.D. (manufactured by U.S. Stoneware Company). After charging, the mill was run at a peripheral speed of 230 feet/minute for seven hours. On completion of grinding the powder was discharged from the mill and a sieve or screen analysis made. The results of the analysis was as follows:

| Retained On | Tyler Equivalent | Percent Weight |
|---|---|---|
| No. 30 mesh screen | 28 mesh | 0.20 |
| No. 50 mesh screen | 48 mesh | 1.80 |
| No. 80 mesh screen | 80 mesh | 10.00 |
| No. 100 mesh screen | 100 mesh | 6.00 |
| No. 200 mesh screen | 200 mesh | 37.00 |
| No. 325 mesh screen | 325 mesh | 40.00 |
| Passes through No. 325 screen |  | 5.00 |
|  |  | 100.0 |

The film properties of the cured composition were determined using a particle size distribution smaller than 80 mesh, i.e., 100% passed 80 mesh.

Sprayability was determined visually. A solvent-cleaned 1½" x 6", 20 gauge, cold rolled steel panel was heated on a carefully controlled hot plate to a temperature of 450° F. A stream of the powder was directed at the panel with a Binks Model 171 Flocking Gun (OB-11 nozzle). The panel was allowed to remain on the hot plate for a two minute cure cycle.

The film flow, film continuity and film appearance were evaluated visually. The film continuity was further evaluated with the Bird Dog Holiday Detector, a highly sensitive, wet sponge device for locating defects in protective coatings. A maximum of 30.0 volts was applied to the coated surface.

To evaluate the flexibility, a solvent-cleaned 1½" x 6", 20 guage, cold rolled steel panel was heated to 450° F. A 6–8 mil. film of the coating was sprayed on the panel. After a two-minute cure cycle, the panel was removed and allowed to cool to room temperature for a period in excess of 20 minutes. The panel was then bent over a 1 inch diameter mandrel. The angle at which the first crack appears was recorded as the measure of flexibility.

The solvent resistance was determined by immersing the coated panel in methyl ethyl ketone. The time was then recorded when the surface coating could be scratched with the fingernail.

The gel times were determined using a "Cure Plate" with a range of 350° F. to 480° F. manufactured by Thermo Electric Company, Cleveland, Ohio. The cure plate was adjusted to maintain the desired temperature. A small quantity (ca. 1 cc. by volume) of powder was placed on the surface of the cure plate. The melted powder was agitated at a moderate rate with a tongue depressor until gelation occurred. The gel time is the number of seconds from the time the powder comes in contact with the cure plate until gelation begins.

The film properties of the above-cured composition were as follows:

(a) sprayability at 450° F.: satisfactory
(b) film flow: satisfactory
(c) film continuity: satisfactory
(d) film appearance: satisfactory
(e) flexibility: greater than 90°
(f) methyl ethyl ketone resistance: greater than 1 hour
(g) gel time,

| Temperature, degrees Fahrenheit | Time (seconds) |
|---|---|
| 350 | 29.0±1.0 |
| 400 | 11.0±0.5 |
| 450 | 4.8±0.2 |

*Example II*

This example illustrates the superiority of cylindrical high density grinding media over other grinding media.

Approximately 2½ quarts (1162 grams) of the polyepoxide formulation employed in Example I was placed in a 1½-gallon pebble mill containing 1½ quarts of various grinding media and ground for various time intervals. The resulting pulverized powder was tested for ease of agglomeration (lack of separation) and the film appearance of the cured composition noted. The results of the several experiments are noted in Table I.

*Example III*

This example illustrates that polyepoxide formulations ground with certain cylindrical high density grinding media agglomerate to form stable homogenous composites which do not segregate.

The polyepoxide composition of Example I was ground for seven hours according to the procedure of Example II using the cylindrical high density grinding media. Table II shows the gel times in seconds at three different temperatures of the various portions of the agglomerated powder, after being separated by mesh size (U.S. Standard).

TABLE I

| Type of Grinding Media | Grinding Time (hrs.) | Percent Retained on No. Mesh Screen | | | | Ease of Agglomeration | Film Appearance |
|---|---|---|---|---|---|---|---|
| | | No. 48 | No. 100 | No. 200 | No. 325 | | |
| 1 inch porcelain balls (Sp. Gr.: 2.3–2.5) | 20 | 0.2 | 0.8 | 28.5 | 65.2 | Poor | Poor. |
| | 40 | 0.2 | 0.9 | 29.7 | 64.5 | ___do___ | Do. |
| 1 inch high density balls (Sp. Gr.: 3.65) | 20 | 0.2 | 0.6 | 10.2 | 78.0 | ___do___ | Do. |
| | 40 | 0.4 | 1.6 | 9.8 | 84.4 | ___do___ | Do. |
| 1 inch flint pebbles (Sp. Gr.: 2.0–2.5) | 20 | 0.2 | 0.6 | 6.1 | 83.6 | ___do___ | Do. |
| | 40 | 0.2 | 1.3 | 7.4 | 81.9 | ___do___ | Do. |
| 13/16 inch x 13/16 inch O.D. cylindrical high density "Borundum" [1] (Sp. Gr.: 3.65) | 20 | 0.2 | 1.3 | 11.6 | 82.6 | Good | Good. |
| | 40 | 0.8 | 4.5 | 9.4 | 62.8 | ___do___ | Do. |
| | 60 | 1.6 | 10.7 | 29.1 | 53.8 | ___do___ | Do. |
| ½ inch flint pebbles (Sp. Gr.: 2.0–2.5) | 20 | 0.6 | 0.6 | 6.1 | 85.4 | Poor | Poor. |
| | 40 | 0.2 | 0.6 | 7.4 | 84.9 | ___do___ | Do. |
| ½ inch flint pebbles (Sp. Gr.: 2.0–2.5) | 20 | 0.2 | 0.6 | 3.2 | 88.7 | ___do___ | Do. |
| | 40 | 0.2 | 0.8 | 4.4 | 87.9 | ___do___ | Do. |

[1] U.S. Stoneware Company.

TABLE II

| Temp., ° F. | Whole Powder | 50 Mesh | 100 Mesh | 200 Mesh | 325 Mesh | Fines <325 Mesh |
|---|---|---|---|---|---|---|
| 350 | 32 | 31 | 32 | 30 | 31 | 32 |
| 400 | 10 | 10 | 10 | 10 | 10 | 10 |
| 450 | 5 | 5 | 5 | 5 | 5 | 5 |

It is clearly seen that the respective gel times are practically identical for all portions and also for the whole powder thus illustrating that such cylindrical high density grinding media agglomerates the diverse ingredients of the formulation into homogenous composites which do not separate.

*Example IV*

This example further illustrates the stability of the polyepoxide powder pulverized in a pebble mill using a cylindrical high density grinding media. The pulverized powder was stored at 75°–90° F. for one year and the film properties checked at one day, six months and one year. The pulverized formulation of Example I (100% passing through 100 mesh) was employed. A film was prepared by the same procedure and cured at 450° F. for 30 seconds and evaluated. The results of these experiments are tabulated in Table III.

*Example V*

Substantially the same procedure of Example I was repeated except the polyepoxide employed was a glycidyl polyether of 2,2-bis(4-hydroxyphenyl)propane having a molecular weight of 2,900 a softening point of 131° C. and an epoxy value of 0.05 eq./100 g. The sprayability at 450° F. was satisfactory. The film flow, continuity, and appearance was satisfactory. The flexibility was greater than 90° and the methyl ethyl ketone resistance was greater than one hour.

*Example VI*

The procedure of Example I is substantially repeated wherein an equal amount of stannous caproate, stannous laurate, stannous oleate, and stannous naphthenate is employed in lieu of the stannous octoate. Similar results are obtained.

TABLE III.—POWDER STABILITY (75-90° F.)

| Dry Blending | Powder Passes Through 100 Mesh (percent) | 450° F., 30 seconds | | | |
|---|---|---|---|---|---|
| | | Flow | Gel Time (sec.) | MEK Resist. (min.) | Flex. (deg.) |
| Time Lapse, 1 Day | | | | | |
| Pebble Milling Technique | 100 | Good | 4-5 | >30 | >90 |
| Time Lapse, 6 Months | | | | | |
| Pebble Milling Technique | 100 | Good | 4-5 | >30 | >90 |
| Time Lapse, 1 Year | | | | | |
| Pebble Milling Technique | 100 | Good | 4-5 | >30 | >90 |

We claim as our invention:

1. A one-step process for preparing homogeneous fluidizable polyepoxide coating compositions which comprises pulverizing (1) a polyepoxide having a vic-epoxy equivalency greater than 1.0, (2) a benzophenone tetracarboxylic dianhydride and (3) a stannous salt of a monocarboxylic acid in a pebble mill containing cylindrical high density media having a specific gravity of at least 2.75 as the grinding media.

2. A process as in claim 1 wherein the polyepoxide is a glycidyl polyether of a polyhydric phenol.

3. A process as in claim 1 wherein the composition additionally comprises from 5 to 50 parts by weight of an inert filler.

4. A process as in claim 1 wherein the stannous salt is a salt of a fatty acid containing from 5 to 20 carbon atoms in the molecule.

5. A process as in claim 1 wherein the components are pulverized for a time sufficient to obtain the required particle agglomeration and film flow.

6. A process as in claim 5 wherein the compotents are pulverized for at least five hours.

7. A process as in claim 1 wherein the weight ratio of grinding media to components is from 10:1 to 1:1.

8. A one-step process for preparing a homogeneous fluidizable polyepoxide composition which comprises pulverizing (1) from 50 to 80 parts by weight of a glycidyl polyether of 2,2-bis(4-hydroxyphenyl)propane, (2) from 5 to 20 parts by weight of a benzophenone tetracarboxylic dianhydride and (3) from 0.5 to 5 parts of stannous octoate per 100 parts of the glycidyl polyether in a pebble mill containing cylindrical high density media having a specific gravity of at least 2.75 as the grinding media.

9. A process as in claim 8 wherein the cylindrical high density grinding media has a specific gravity greater than 3.5.

10. A one-step process for preparing a homogeneous fluidizable polyepoxide coating composition which comprises pulverizing (1) from 65 to 75 parts by weight of a glycidyl polyether of 2,2-bis(4-hydroxyphenyl) propane having a molecular weight of from 900 to 1,500 and an epoxide value of from 0.10 to 0.20 eq./100 g., (2) from 8 to 15 parts by weight of 3,3',4,4'-benzophenone tetracarboxylic dianhydride and (3) from 0.5 to 3.0 parts by weight of stannous octoate, in a pebble mill containing cylindrical high density media having a specific gravity of at least 2.75 as the grinding media.

11. A process as in claim 10 wherein the cylindrical high density grinding media has a specific gravity greater than 3.5.

References Cited

UNITED STATES PATENTS

| 3,201,360 | 8/1965 | Proops et al. | 260—18 |
| 3,098,279 | 7/1963 | McCracken et al. | 260—47 |
| 3,039,987 | 6/1962 | Elbling | 260—37 |

DONALD E. CZAJA, *Primary Examiner.*

L. J. BERCOVITZ, *Examiner.*

C. W. IVY, *Assistant Examiner.*